United States Patent
Dietachmayr

(10) Patent No.: US 12,134,237 B2
(45) Date of Patent: Nov. 5, 2024

(54) METHOD FOR PROVIDING BLANKS FROM A FIBRE WEB

(71) Applicant: GFM GmbH, Steyr (AT)

(72) Inventor: Harald Dietachmayr, Sierning (AT)

(73) Assignee: GFM GmbH, Steyr (AT)

( * ) Notice: Subject to any disclaimer, the term of this patent is extended or adjusted under 35 U.S.C. 154(b) by 72 days.

(21) Appl. No.: 17/925,036

(22) PCT Filed: Jun. 18, 2021

(86) PCT No.: PCT/AT2021/060211
§ 371 (c)(1),
(2) Date: Nov. 14, 2022

(87) PCT Pub. No.: WO2022/006603
PCT Pub. Date: Jan. 13, 2022

(65) Prior Publication Data
US 2023/0182410 A1    Jun. 15, 2023

(30) Foreign Application Priority Data
Jul. 8, 2020   (AT) .............................. A 50588/2020

(51) Int. Cl.
*B29C 70/38*       (2006.01)
*B29C 70/54*       (2006.01)
(Continued)

(52) U.S. Cl.
CPC ............ *B29C 70/38* (2013.01); *B29C 70/542* (2013.01); *B65D 85/62* (2013.01);
(Continued)

(58) Field of Classification Search
CPC ....... B29C 31/085; B29C 31/08; B29C 31/04; B29C 31/008; B29C 70/543; B29C 70/541; B29C 70/388; B29C 70/386; B29C 70/38
See application file for complete search history.

(56) References Cited

U.S. PATENT DOCUMENTS

| | | | |
|---|---|---|---|
| 4,666,546 A * | 5/1987 | Treber | ................... B29C 70/30 156/264 |
| 10,695,991 B2 | 6/2020 | Bitterlich et al. | |

(Continued)

FOREIGN PATENT DOCUMENTS

| | | |
|---|---|---|
| CH | 704 406 A1 | 7/2012 |
| DE | 20 2007 006 528 U1 | 10/2008 |

(Continued)

OTHER PUBLICATIONS

Angerer, A., C. Ehinger, A. Hoffmann, W. Reif, G. Reinhart, Design of an Automation System for Preforming Processes in Aerospace Industries, 2011 IEEE International Conference on Automation Science and Engineering Trieste Italy, (2011), pp. 557-562. (Year: 2011).*

(Continued)

*Primary Examiner* — Matthew J Daniels
(74) *Attorney, Agent, or Firm* — Muirhead and Saturnelli, LLC

(57) ABSTRACT

Providing blanks from a fibre web includes removing the blanks from removal regions and depositing the blanks in at least one deposit element. The blanks are then removed from the deposit elements in accordance with a sequence predefined by a layer-by-layer construction of a workpiece. The blanks that are individually removed from the removal regions are stacked on top of one another in the deposit elements in a sequence that corresponds to a layering sequence of the blanks in the workpiece. The blanks are then (Continued)

successively removed individually from the deposit elements in a sequence that is reversed with respect to the layering sequence of the blanks in the workpiece and are stacked on top of one another in a storage element before being successively removed from the storage element in the sequence predefined for constructing the workpiece layer-by-layer and inserted into a mould for producing the workpiece.

8 Claims, 2 Drawing Sheets

(51) Int. Cl.
*B65D 85/62* (2006.01)
*B29K 105/00* (2006.01)
*B33Y 10/00* (2015.01)
*B33Y 40/10* (2020.01)

(52) U.S. Cl.
CPC ......... *B29K 2105/256* (2013.01); *B33Y 10/00* (2014.12); *B33Y 40/10* (2020.01)

(56) References Cited

U.S. PATENT DOCUMENTS

| | | |
|---|---|---|
| 2013/0306228 A1 | 11/2013 | Buehlmeyer |
| 2013/0306233 A1 | 11/2013 | Pini et al. |
| 2016/0368226 A1 | 12/2016 | Encinosa et al. |
| 2020/0215579 A1* | 7/2020 | van Overbeek .......... B07C 5/36 |

FOREIGN PATENT DOCUMENTS

| | | |
|---|---|---|
| DE | 10 2012 006 032 A1 | 10/2013 |
| DE | 10 2014 223 982 B3 | 4/2016 |
| EP | 0 511 937 A1 | 11/1992 |
| WO | WO 2012/104174 A1 | 8/2012 |

OTHER PUBLICATIONS

Bjornsson, A., M. Jonsson, D. Eklund, J.E. Lindback, M. Bjorkman, Getting to grips with automated prepreg handling, Prod. Eng. Res. Develop., vol. 11 (2017), pp. 445-453. (Year: 2017).*
U.S. Appl. No. 17/925,035, filed Nov. 14, 2022, Dietachmayr.

* cited by examiner

METHOD FOR PROVIDING BLANKS FROM A FIBRE WEB

TECHNICAL FIELD

The system described herein relates to providing blanks from a fibre web in a sequence predefined for a layer-by-layer construction of a workpiece.

BACKGROUND OF THE INVENTION

Complex workpieces can be produced from appropriately formed, preferably pre-impregnated or thermoplastic fibre webs by inserting corresponding blanks from such fibre webs into moulds and, depending on the design, optionally curing the workpieces under pressure. The layer-by-layer construction of the workpiece from individual different blanks requires the provision of these blanks in a sequence determined by the layer-by-layer construction of the workpiece to be produced. However, the layer-by-layer sequence cannot be taken into consideration when distributing the blanks over the surface of the fibre web, taking into account a minimum amount of waste. This means that the blanks, which are to be available in an order determined by the layer-by-layer construction of the workpiece, are distributed in an unordered manner over the fibre web surface with regard to the layer-by-layer sequence (DE 20 2007 006 528 U1). The individual blanks must therefore be lifted out of the fibre web with the aid of appropriate handling devices and either temporarily stored on at least one deposit table or directly fed to a lay-up station to form a moulded body. Irrespective of whether the blanks required to build up the moulded body are fed directly to the lay-up station or are first deposited on at least one deposit table next to each other or in stacks, the blanks must be sorted according to the layer-by-layer construction of the moulded body to be formed, which in the case of workpieces made up of a large number of blanks requires a time-consuming sorting process for the blanks.

In order to automate the sorting process, it has already been proposed (EP 0 511 937 A1) to lift the blanks from individual removal regions in the predefined distribution layer out of the fibre web, which are not distributed in a layer sequence corresponding to the layer sequence in the workpiece to be produced, and to deposit the blanks in the predefined distribution layer in deposit elements, in order to then store the deposit elements in an intermediate store. To insert the blanks into the mould for the production of the workpieces, the corresponding deposit elements are removed from the intermediate storage and fed to a turning device in order to be able to insert the blanks, which have been deposited on the deposit element with the impregnated side facing upwards, into the mould with the impregnation layer facing downwards. For this purpose, the blanks are lifted from the deposit element by a turning device in the distribution layer and turned through 180° about a horizontal axis in order to then be inserted individually into the mould with the aid of a laying device in the sequence of the layer construction of the workpiece to be produced. Since the distribution position of the blanks in the removal regions and the order of the blanks within the layer sequence of the workpiece to be produced are known and the position and order do not change during blank removal and during further conveying of the blanks by means of the deposit elements and the turning device, the individual blanks can be detected precisely by the laying device and inserted into the mould in the order specified by the layer sequence in the workpiece. However, a particular disadvantage of this mechanism is that due to the mandatory maintenance of the distribution position after the removal of the blanks from the respective removal region of the fibre web, deposit elements with corresponding depositing surfaces must be provided. In addition, it must be possible to provide all blanks required for the construction of at least one section of the workpiece having several layers from a deposit element in a corresponding sequence, so that despite the possible unordered distribution of the blanks over a removal region of the fibre web, a possibility of considerable waste must be accepted. The known sorting systems are therefore essentially only suitable for workpieces whose layers can be provided by blanks from a single removal region, which considerably limits the area of application.

In the case of workpieces that consist of comparatively few layers, the blanks for the individual layers can be stored together in deposit elements (WO 2012/104174 A1) in order to then be able to remove the blanks from the individual deposit elements by at least one robot in a sequence corresponding to the layer construction of the workpieces to be produced. The blanks are then inserted into the mould. Since matching blanks for a plurality of workpieces are to be provided next to each other and aligned on the deposit elements, this in turn results in a considerable space requirement for the deposit elements. Apart from that, such sorting devices are only suitable for the production of workpieces with a comparatively small number of layers.

SUMMARY OF THE INVENTION

The system described herein allows a plurality of blanks, which are distributed in a fibre web independently of a removal sequence, to be removed from the fibre web without time-consuming searching in a sequence which enables the blanks to be passed on advantageously in a predefined sequence determined by the workpiece structure.

The system described herein provides a mechanism where the blanks that are individually removed from the removal regions are stacked on top of one another in the deposit elements in each case in a sequence corresponding to a layering sequence of the blanks in the workpiece. The blanks for a workpiece that are stacked in the deposit elements are then successively removed individually from the deposit elements in a sequence which is reversed with respect to a layering sequence of the blanks in the workpiece and are stacked on top of one another in a storage element, before being successively removed from the storage element in the sequence predefined for constructing the workpiece layer-by-layer and inserted into a mould for producing the workpiece.

Since the blanks cut out of the fibre web are removed from a removal region irrespective of whether the blanks in the removal region correspond to a sequence determined by the workpiece structure, the blanks required for the production of a workpiece are progressively released from the fibre web from removal region to removal region, making a time-consuming search of the fibre web for blanks for specific layers in the workpiece unnecessary.

Despite the removal of the blanks from removal regions in which the blanks are not present in an order corresponding to the workpiece structure, a pre-sorting can be carried out which allows a subsequent transfer in a comparatively simple manner in an order determined by the workpiece structure. The individual blanks, the order of which is known within the workpiece structure, are thus stacked on top of one another in at least one deposit element in each removal region in a sequence that corresponds to the respective layering sequence in the workpiece to be produced. This means that the blanks in each deposit element are stacked on top of each other in an ascending sequence of an order of the blanks when the workpiece is built up from the individual blanks in an ascending order sequence. The order of the individual blanks is determined by the position in the workpiece structure predefined for each blank, so that the blank for the $i^{th}$ position has the $i^{th}$ order.

If, for example, a removal region includes the blanks for the third, eighth and nineteenth layers of the workpiece, i.e. if the blanks in the removal region have the order three, eight and nineteen, the blanks are deposited in a stack with an ascending order in a deposit element, so that the blank for the third layer is followed by the blank for the eighth layer and then by the blank for the nineteenth layer in the stack. Consequently, the blanks can be removed one after the other from the stack of the respective storage element according to the descending order of the layers of the workpiece to be produced. Since all blanks required for the workpiece structure are stored to be sorted from the individual removal regions in deposit elements, the blanks can be removed from the blank stacks of the individual deposit elements in a reverse sequence compared to the layer sequence of the workpiece structure in order to stack all blanks required for the structure of a workpiece in the reverse sequence in a storage element. Since with n blanks for the production of a workpiece the $n^{th}$ blank forming the uppermost layer of the workpiece thus represents the lowest stacking layer in this storage element, onto which the remaining blanks are deposited one after the other in the reverse order of the layer sequence of the workpiece, the blank provided for the lowest layer of the workpiece with the serial number 1 forms the uppermost stacking layer, so that the blanks provided for the individual layers of the workpiece can be taken from the storage element one after the other and placed in the correct order in the mould for producing the workpiece.

The depositing of the blanks from the individual deposit elements into a storage element for all blanks required for the production of a workpiece in a continuous but reverse sequence corresponding to the layer sequence in the workpiece to be produced requires an additional sorting step, but the loading of the mould for the production of the workpiece is simplified by the provision of all blanks required for the production of a workpiece on a common storage element and is independent of the cycle times for cutting and removing the blanks from the fibre web.

If the removal regions include a larger number of blanks, the removal of the individual blanks can be accelerated by the provision of at least two grippers for the blanks, because the grippers can deposit the blanks gripped by the grippers independently of one another in separate deposit elements to form stacks, in each case in an ascending or descending order within the stacks which is required for the layer-by-layer construction of the workpiece and depends on the ascending or descending order of the layers in the workpiece.

However, the individual blanks should not only be removed from the stacks of storage elements in an ascending or descending order depending on the ascending or descending order of the layers of the workpiece to be produced, but also transferred to the mould for the workpiece in an aligned position. For this purpose, the individual blanks can be placed one above the other in a predefined position in stacks in the storage elements and the storage element, so that the spatial orientation of the individual blanks placed in alignment in the stacks is determined on the basis of the position of the deposit elements or the storage element, and the blanks can be transferred to the deposit elements and the storage element without having to determine again the orientation of the blanks. The orientation of the blanks in relation to the deposit elements does not have to correspond to the original orientation of the blanks within the fibre web. Preferably, an orientation is chosen that allows a space-saving stacking of the blanks on the deposit elements.

BRIEF DESCRIPTION OF THE DRAWINGS

The method according to the system described is explained in more detail with reference to the drawings, wherein.

DESCRIPTION OF VARIOUS EMBODIMENTS

To produce a workpiece made up of stacked layers of a fibre material, blanks $Z_i$ corresponding to the individual layers are cut out of, for example, a pre-impregnated fibre web 1 and inserted in a sequence corresponding to a layer sequence into a mould provided for the production of the workpiece. In order to be able to use the fibre web 1 optimally with a minimised waste, the individual blanks $Z_i$ are arranged according to the size and geometric outline shape of the blanks and are distributed over the fibre web 1 independently of a position of each of the blanks in the workpiece structure. The order i of the blanks $Z_i$ is determined by the sequence of the individual layers of the workpiece, where i stands for the numerical series 1 to n, if n means the total number of blanks $Z_i$ required for the workpiece structure.

In order to ensure that the entire fibre web 1 does not have to be searched for the provision of the individual blanks $Z_i$ in a sequence corresponding to the layer construction of the workpiece to be produced, in order to be able to remove the blanks $Z_i$ in an order which is reversed in relation to the layer sequence in the workpiece to be produced, the blanks $Z_i$ are removed one after the other from individual removal regions $E_j$ and are deposited per removal region $E_j$ in at least one deposit element $A_j$ in stacked form, in each case in an ascending or descending order which corresponds to the ascending or descending order of the layers in the structure of the workpiece to be produced.

Figure 1:
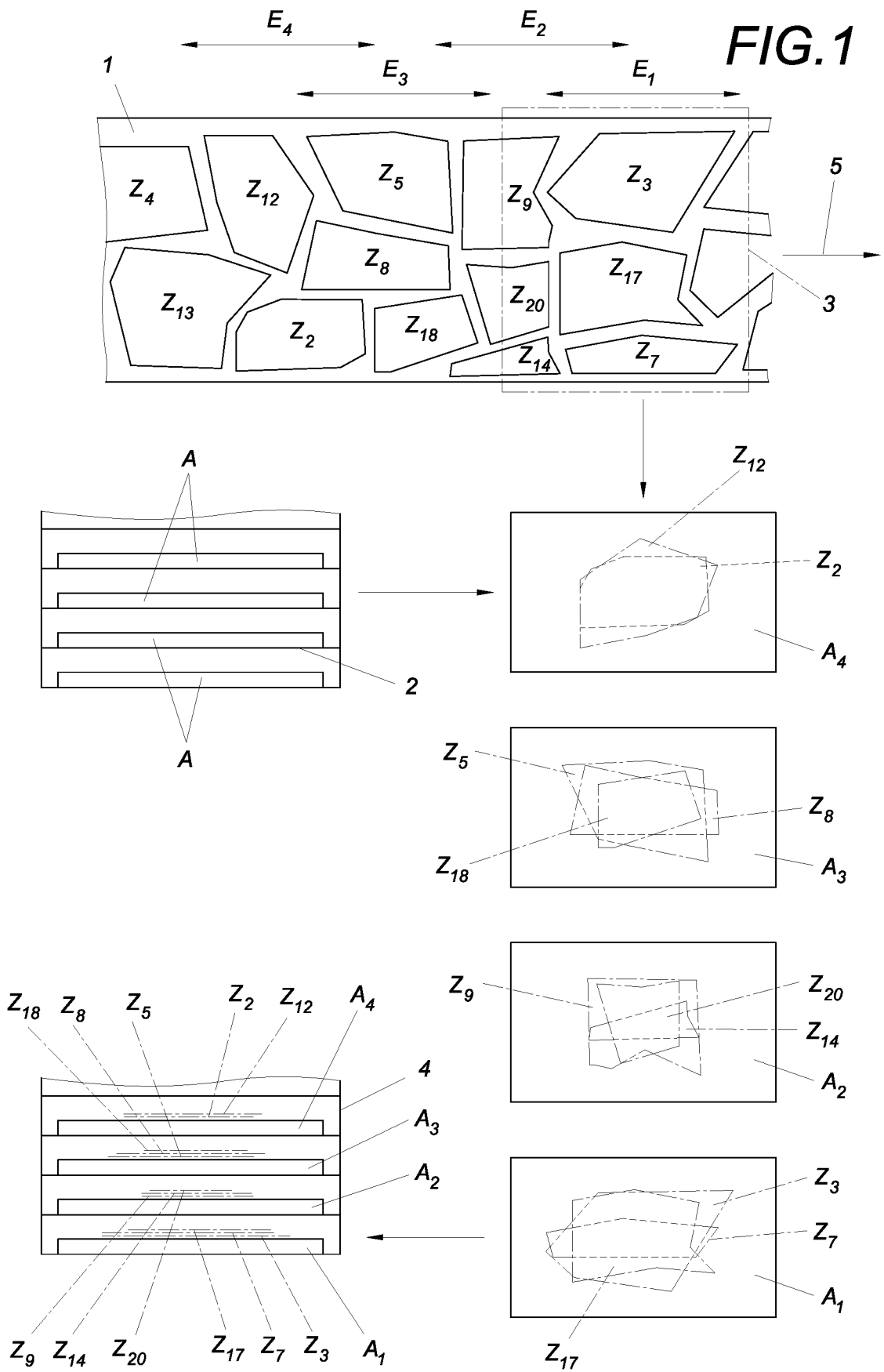
FIG. 1 shows a part of a sorting device for stacking blanks removed from individual removal regions in deposit elements in a schematic block diagram according to the system described herein and FIG. 2 shows the sorting device in an area of the transfer of the blanks stacked in the deposit elements to a storage element for stacking all blanks required for production of a workpiece, also in a schematic block diagram, according to the system described herein.

As can be seen from FIG. 1, in order to remove the blanks $Z_3$, $Z_{17}$ and $Z_7$, which form the subsequent layers No. 3, 17 and 7, from a removal region $E_1$, a deposit element $A_1$ is first provided for stacking the blanks $Z_i$ from a supply store 2. The blanks $Z_3$, $Z_{17}$ and $Z_7$, which are provided with a corresponding identifier for their order, are released from the fibre web 1 in an ascending order corresponding to the layering sequence of the workpiece to be produced in the removal region $E_1$ with the aid of a removal device 3 indicated by a dot-dash line, so that first of all the blank $Z_3$ is deposited from the fibre web 1 in a predefined orientation in the deposit element $A_1$, specifically in a specific orientation with respect to the deposit element $A_1$, which does not have to correspond to the original orientation and is preferably selected in such a way that the space conditions on the deposit element can be used advantageously for stacking the blanks $Z_i$. Once the blank $Z_3$ has been aligned, the blank $Z_7$ and the blank $Z_{17}$ are each aligned and placed one above the other in a stack on the blank $Z_3$. When all the blanks $Z_i$ have been removed from the removal region $E_1$, the loaded deposit element $A_1$ is conveyed to a storage unit 4 from which the individual deposit elements $A_j$ can be made available for the removal of their blanks $Z_i$. Although the storage unit 4 is shown as a separate storage unit from the supply store 2 for reasons of clarity, in practice only one storage unit may be provided which takes over the tasks of both the supply store 2 and the storage unit 4.

To remove the blanks $Z_i$ from a subsequent removal region $E_2$, the fibre web 1 is conveyed further in the direction of an arrow 5 in order to align the removal region $E_2$ with respect to the removal device 3. The removal process is repeated, where the blanks $Z_9$, $Z_{14}$ and $Z_{20}$ are deposited one after the other on an empty deposit element $A_2$ from the supply store 2 to form a stack before the deposit element $A_2$ is placed in the storage unit 4. In order to ensure better stackability, the blank $Z_9$ is placed in an aligned manner on the deposit element $A_2$ rotated by 90° in relation to the orientation in the fibre web 1.

After a conveying step in the direction of the arrow 5, the blanks $Z_i$ from the removal region $E_3$ are placed one on top of the other in an ascending order on a deposit element $A_3$ in an analogous manner to form a stack, where the blank $Z_5$ is deposited on the deposit element $A_3$ in an aligned manner and then the blanks $Z_8$ and $Z_{18}$ are stacked one on top of the other on the blank $Z_5$ in order to have this stack available for removing the blanks $Z_i$ after the deposit element $A_3$ has been placed in the storage unit 4.

The blanks $Z_2$ and $Z_{12}$ of the removal region $E_4$ are removed from the fibre web 1 in the same way and deposited in a stack in an aligned manner in a deposit element $A_4$ before the deposit element $A_4$ is transferred to the storage unit 4. The blank $Z_{12}$ is turned before being deposited in order to improve stackability on the deposit element $A_4$. According to FIG. 1, after the deposit element $A_4$ and all other deposit elements $A_j$ have been stored in the storage unit 4, all blanks $Z_i$ required for the production of a workpiece are contained in the removal regions $E_j$ for individual removal in a descending order.

For the sake of a clear presentation, FIG. 1 shows the deposit elements $A_j$ loaded with the associated blanks $Z_i$ one after the other corresponding to the removal regions $E_j$, although the deposit elements $A_j$ are transferred from the associated removal region $E_j$ to the storage unit 4 after being loaded with the blanks $Z_i$ before the blanks $Z_i$ of the subsequent removal region $E_{j+1}$ are stacked on a new deposit element $A_{j+1}$. In the storage unit 4, the stored, loaded deposit elements $A_1$-$A_4$ are indicated with the blank stacks, where the deposit elements $A_j$ do not have to be stored in storage unit 4 in the order of the removal regions. It is only necessary to know in which storage locations the individual deposit elements $A_j$ are located.

To produce a workpiece from blanks $Z_1$-$Z_n$, the blanks are placed in an appropriate mould in ascending order starting with $Z_1$, so that blank $Z_1$ forms the bottom layer and blank $Z_n$ the top layer of the workpiece to be produced.

Since the blanks $Z_i$ are stored in the stacks of the deposit elements $A_j$ in an ascending order, the blanks $Z_i$ stacked in the deposit elements $A_j$ can be removed one after the other from the deposit elements $A_j$ in a continuous order which is reversed with respect to the ascending order of the layers in the workpiece and stacked on a storage element S which now contains all n blanks required for the production of a workpiece.

Figure 2:
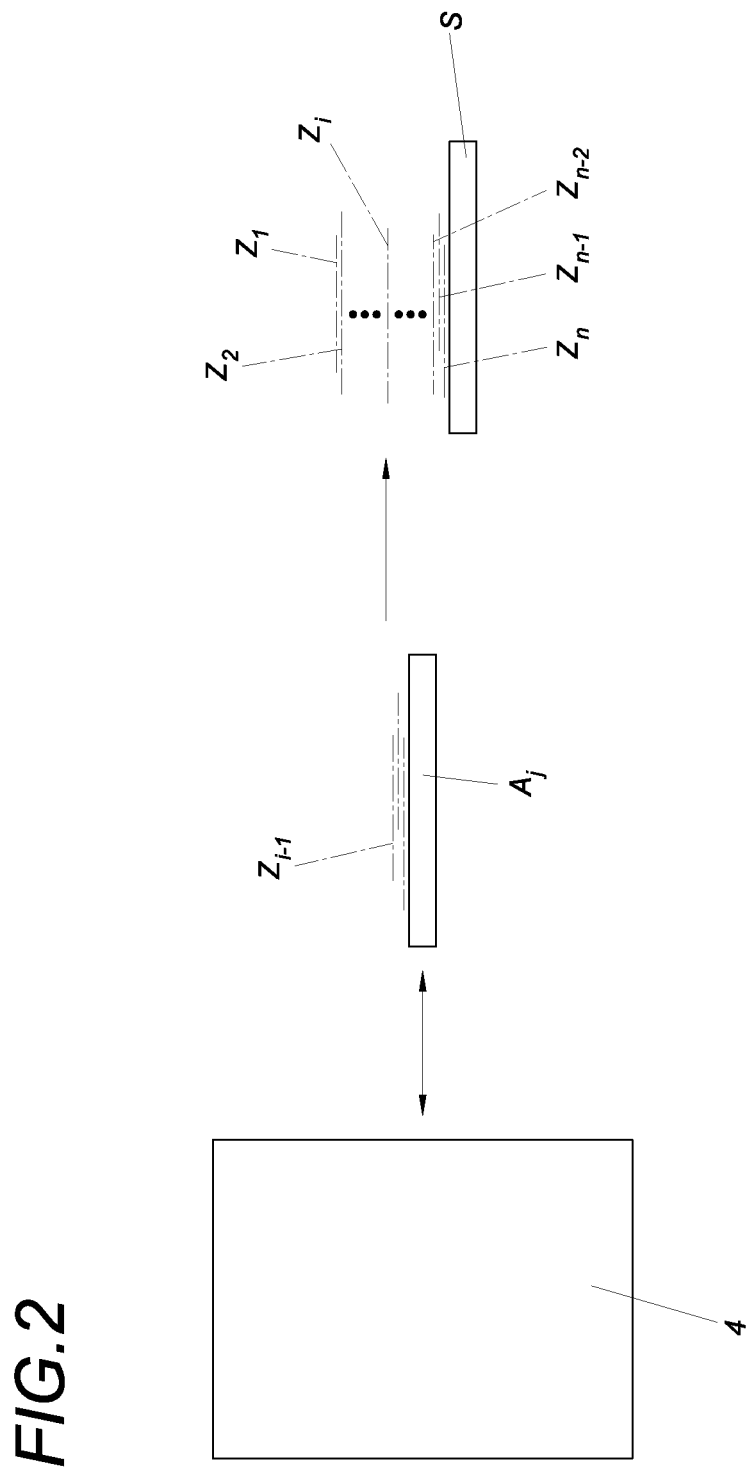

FIG. 2 shows how the blanks $Z_i$ are stored in the storage element S from the storage unit 4. First, the deposit element $A_j$ containing the blank $Z_n$ is selected from the storage unit 4. Since the blank $Z_n$ forms the top layer of the stack of blanks of this deposit element, the blank $Z_n$ can simply be removed from the stack in an aligned position and placed on the storage element S as the bottom layer, optionally with a changed orientation, in order to then select the deposit element $A_j$ with the blank $Z_{n-1}$ forming the top layer of the stack and to deposit the blank $Z_{n-1}$ in the storage element S on the blank $Z_n$ in an aligned position before the blank $Z_{n-2}$ is transferred to the storage element S in an analogous manner.

Accordingly, the stacking layer of the storage element, which contains the blank $Z_i$, of the blank $Z_{i-1}$ respectively following in the reverse sequence is applied until the stack ends with the uppermost layers $Z_2$ and $Z_1$. The blanks $Z_1$-$Z_n$ required for the production of a workpiece can thus be taken from the blank stack of the storage element S in a continuous sequence and inserted one after the other into the mould required for the production of the workpiece. This means that starting with blank $Z_1$ and ending with blank $Z_n$, all blanks are made available in the required sequence for loading the workpiece mould in a simple manner.

If the blanks $Z_i$ are deposited in the individual removal regions $E_j$ not only in one deposit element $A_j$, but in two or more deposit elements $A_{jk}$, the sorting process can be accelerated considerably because the deposit elements $A_{jk}$ available for each removal region $E_j$ can be loaded with the blanks $Z_i$ independently of each other via separate grippers, again in an ascending order for each deposit element $A_{jk}$.

It should also be noted that the removal regions E of the fibre web 1 do not have to contain only blanks $Z_i$ for one workpiece. If blanks for several workpieces are provided in a removal region, which can lead to a further minimisation of waste, separate deposit elements A are provided for the blanks Z of separate workpieces in order to be able to provide a set of deposit elements A for each workpiece, the stacks of which contain all blanks required for the construction of the workpiece in a corresponding sequence.

The invention claimed is:

1. A method for providing blanks from a fibre web in a sequence predefined for a layer-by-layer construction of a workpiece from the blanks, comprising:
   subdividing the fibre web into a plurality of removal regions, each having a sequence number according to a relative position on the fibre web, wherein at least some of the removal regions overlap with a prior one of the removal regions having a lower sequence number and with a subsequent one of the removal regions having a higher sequence number;
   removing each of the blanks from one of the plurality of removal regions of the fibre web in an order based on the sequence numbers of the removal regions;
   depositing each of the blanks per removal region in at least one of a plurality of deposit elements;
   removing each of the blanks from the deposit elements in accordance with a sequence predefined by the layer-by-layer construction of the workpiece, wherein the blanks that are individually removed from the removal regions are stacked on top of one another in the deposit elements in each case in a sequence that corresponds to a layering sequence of the blanks for constructing the workpiece layer-by-layer, and wherein the blanks for a workpiece that are stacked in the deposit elements are successively removed individually from the deposit elements in a sequence which is reversed with respect to the layering sequence of the blanks for constructing the workpiece layer-by-layer;

stacking the blanks on top of one another in a storage element;

successively removing the blanks from the storage element in the layering sequence of the blanks for constructing the workpiece layer-by-layer; and inserting the blanks into a mould for producing the workpiece.

2. The method according to claim 1, wherein the blanks are removed from the removal regions of the fibre web using at least two grippers and are stacked on top of one another in at least two deposit elements per removal region.

3. The method according to claim 2, wherein the blanks are stacked on top of one another in a predefined position in the deposit elements and in the storage element.

4. The method according to claim 3, wherein at least some of the blanks are turned prior to stacking to improve stackability.

5. The method according to claim 2, wherein at least some of the blanks are turned prior to stacking to improve stackability.

6. The method according to claim 1, wherein the blanks are stacked on top of one another in a predefined position in the deposit elements and in the storage element.

7. The method according to claim 6, wherein at least some of the blanks are turned prior to stacking to improve stackability.

8. The method according to claim 1, wherein at least some of the blanks are turned prior to stacking to improve stackability.

* * * * *